US012650177B2

(12) United States Patent
Edelmann et al.

(10) Patent No.: US 12,650,177 B2
(45) Date of Patent: Jun. 9, 2026

(54) ELECTROMECHANICALLY ACTUATABLE PRESSURE MEDIUM CONTROL VALVE

(71) Applicant: Robert Bosch GmbH, Stuttgart (DE)

(72) Inventors: Volker Edelmann, Buchen (DE); Andrej Gardt, Abstatt (DE); Valentin Schubitschew, Tamm (DE)

(73) Assignee: ROBERT BOSCH GMBH, Stuttgart (DE)

( * ) Notice: Subject to any disclaimer, the term of this patent is extended or adjusted under 35 U.S.C. 154(b) by 45 days.

(21) Appl. No.: 18/551,455

(22) PCT Filed: Nov. 4, 2022

(86) PCT No.: PCT/EP2022/080769
§ 371 (c)(1),
(2) Date: Sep. 20, 2023

(87) PCT Pub. No.: WO2023/134897
PCT Pub. Date: Jul. 20, 2023

(65) Prior Publication Data
US 2024/0167579 A1     May 23, 2024

(30) Foreign Application Priority Data

Jan. 11, 2022    (DE) .................... 10 2022 200 173.7

(51) Int. Cl.
*F16K 31/06*        (2006.01)
*B60T 15/02*        (2006.01)
(52) U.S. Cl.
CPC ........ *F16K 31/0682* (2013.01); *B60T 15/025* (2013.01)

(58) Field of Classification Search
USPC .............. 251/30.01, 35, 37, 42, 43, 129.07, 251/129.15, 129.19; 303/119.2;
(Continued)

(56) References Cited

U.S. PATENT DOCUMENTS

| | | | | |
|---|---|---|---|---|
| 4,854,429 A | * | 8/1989 | Casey ..................... | F16F 9/465 |
| | | | | 188/266.2 |
| 5,188,017 A | * | 2/1993 | Grant ..................... | F17C 13/04 |
| | | | | 251/129.21 |

(Continued)

FOREIGN PATENT DOCUMENTS

| | | |
|---|---|---|
| DE | 69110311 T2 | 2/1996 |
| DE | 102011081646 A1 | 2/2013 |

(Continued)

OTHER PUBLICATIONS

International Search Report for PCT/EP2022/080769, Issued Feb. 10, 2023.

*Primary Examiner* — Matthew W Jellett
(74) *Attorney, Agent, or Firm* — NORTON ROSE FULBRIGHT US LLP

(57) ABSTRACT

An electromechanically actuatable pressure medium control valve. The control valve includes a valve housing, an armature, a pole core, a valve casing with a control cross-section, and a closing element controlling a pressure medium flow through the control cross-section. The pressure medium control valve allows for a different throttling of a pressure medium flow between a first valve opening and a second valve opening according to the flow direction of the pressure medium flow through the pressure medium valve.

11 Claims, 3 Drawing Sheets

(58) Field of Classification Search
USPC ................................................. 137/528–543
See application file for complete search history.

(56) References Cited

U.S. PATENT DOCUMENTS

| | | | | | |
|---|---|---|---|---|---|
| 5,711,583 | A | * | 1/1998 | Bareiss ................. | B60T 8/4872 |
| | | | | | 303/119.2 |
| 5,735,582 | A | * | 4/1998 | Eith ...................... | B60T 8/4872 |
| | | | | | 251/30.01 |
| 5,810,330 | A | * | 9/1998 | Eith ...................... | B60T 8/4881 |
| | | | | | 303/119.2 |
| 6,293,513 | B1 | * | 9/2001 | Birkelund ............. | F16K 31/408 |
| | | | | | 251/30.03 |
| 6,705,589 | B2 | * | 3/2004 | Hofmann .............. | B60T 15/028 |
| | | | | | 303/119.2 |
| 6,755,390 | B2 | * | 6/2004 | Masuda .............. | F16K 31/0655 |
| | | | | | 303/119.2 |
| 7,036,788 | B1 | * | 5/2006 | Schneider .......... | F16K 31/0693 |
| | | | | | 251/129.08 |
| 7,422,193 | B2 | * | 9/2008 | Sisk .................... | F16K 31/0696 |
| | | | | | 251/64 |
| 7,661,652 | B2 | * | 2/2010 | Acar ................... | F16K 31/0665 |
| | | | | | 251/129.15 |
| 7,828,265 | B2 | * | 11/2010 | Sisk .................... | F16K 31/0655 |
| | | | | | 251/284 |
| 7,959,129 | B2 | * | 6/2011 | Matsumoto ......... | F16K 31/0655 |
| | | | | | 251/129.15 |
| 9,052,031 | B2 | * | 6/2015 | Leidig ................ | F16K 31/0655 |
| 9,457,784 | B2 | * | 10/2016 | Tokoi .................... | B60T 11/103 |
| 10,487,958 | B2 | * | 11/2019 | Ambrosi ............ | F16K 31/0665 |
| 2005/0173979 | A1 | * | 8/2005 | Voss ........................ | B60T 8/363 |
| | | | | | 303/119.2 |
| 2013/0291535 | A1 | * | 11/2013 | Leiber .................. | F16K 31/408 |
| | | | | | 60/545 |

FOREIGN PATENT DOCUMENTS

| | | |
|---|---|---|
| DE | 102011087896 A1 | 6/2013 |
| DE | 102015218263 A1 | 3/2017 |
| DE | 102016204788 A1 | 9/2017 |
| DE | 102016216347 A1 | 3/2018 |
| DE | 102017213341 A1 | 2/2019 |
| EP | 1582792 A1 | 10/2005 |
| JP | 2020517878 A | 6/2020 |

* cited by examiner

ELECTROMECHANICALLY ACTUATABLE PRESSURE MEDIUM CONTROL VALVE

FIELD

The present invention relates to an electromechanically actuatable pressure medium control valve.

BACKGROUND INFORMATION

Pressure medium control valves are described, for example, in German Patent Application No. DE 10 2017 213 341 A1.

The conventional pressure medium control valve is an example of a 2-stage switching valve which is closed when no electric current is applied and which blocks a pressure medium connection between two valve connections, i.e., an inlet and an outlet. This valve is actuated by a valve coil that can be controlled electrically. When electric current is applied, this valve coil generates a magnetic field to actuate an armature. The armature then performs a stroke movement in the direction of the longitudinal valve axis.

The armature movement is limited in one direction by a pole core, and a valve casing is arranged on the side of the armature opposite the pole core, on which a control cross-section of the pressure medium control valve is formed. For a control of this control cross-section, a closing element actuatable by the armature is provided.

Multi-stage valves are required to control high volumetric flow rates of a pressure medium at low pressures or to control high pressures. Typically, in these valves, a preliminary stage with a relatively small control cross-section opens first, and only subsequently a main stage opens the maximum control cross-section of the pressure medium control valve.

For example, in electronically pressure-controllable vehicle braking systems, multi-stage valves are used to control a pressure medium connection between a master brake cylinder and a pedal travel simulator. In this context, the master brake cylinder is used to detect a braking request from a driver of a motor vehicle. For this purpose, it is coupled with a lever or pedal that can be actuated by the driver. An actuation travel correlating to the braking request is measured and transmitted to an electronic control unit. The latter processes the incoming signals into control signals for an electrically driven pressure generator, which then provides the desired brake pressure.

The pressure medium displaced from the master cylinder with the actuation reaches the pedal travel simulator and is buffered there until the end of the braking process. The pedal travel simulator in turn applies a counterforce to the pedal or lever proportional to the actuation travel, which can be perceived by the driver as haptic feedback that pressure has been built up.

In practice, there are more and more cases where volumetric flows of different magnitudes have to be controlled as a function of a direction of flow through the pressure medium control valve. So far, this is achieved by a flow path parallel to the pressure medium control valve and controlled by a check valve, a so-called controllable bypass.

A disadvantage of this solution, however, is the additional installation space required for the parallel flow path as well as the costs for the required check valve and its installation. In addition, multistage pressure medium control valves are more expensive to manufacture due to the number of sealing points they have and have potentially higher leakage rates than single-stage valves.

SUMMARY

An electromechanically actuatable pressure medium control valve according to the present invention, on the other hand, has the advantage that it enables the pressure medium flow to be throttled to different degrees according to the flow direction in which a pressure medium flows through it. A flow path parallel to the pressure medium control valve is not required for this purpose, and a check valve for controlling the flow direction through this flow path can also be dispensed with.

Further advantages or advantageous developments of the present invention result from the disclosure herein.

Preferably, according to an example embodiment of the present invention, the pressure medium control valve is equipped with a closing element that is coupled to the armature via a tether device. The tether device allows for the closing element to move relative to the armature in or against the stroke direction.

Due to these features, the pressure medium control valve according to the present invention gets by with a single control cross-section or a single sealing point, can thus be manufactured at lower cost and is characterized by low leakage.

According to an example embodiment of the present invention, in a particularly advantageous design, the tether device comprises a cup-shaped armature capsule in which the closing element is accommodated and within which it can be displaced. Such an armature capsule can be produced inexpensively, preferably by forming. The armature capsule can be easily attached to the armature in a force-fit manner via a cup rim.

The closing element, for its part, is preferably designed as a plunger with a plunger shaft and a plunger head controlling the control cross-section of the pressure medium control valve. The plunger head protrudes from an aperture on a cup bottom of the armature capsule. A mechanical stop protrudes radially from the plunger shaft, limiting a stroke movement of the closing element in a first direction from the armature and in the opposite direction from the bottom of the armature capsule.

The end of the plunger shaft opposite the plunger head is accommodated inside a closing element guide provided on the armature. Via a pressure medium channel formed on the armature, this closing element guide is in contact with one of the valve openings of the pressure medium control valve and the closing element is thereby pressurized in the direction of the control cross-section.

BRIEF DESCRIPTION OF THE DRAWINGS

An exemplary embodiment of the present invention is illustrated in the figures and explained in greater detail in the subsequent description.

Each of the figures shows a longitudinal section of a pressure medium control valve according to the present invention. Corresponding components are indicated in the figures with uniform reference signs.

DETAILED DESCRIPTION OF EXAMPLE EMBODIMENTS

In the figures, only the pressure medium-carrying part of a pressure medium control valve is shown. An electrically controllable valve coil for actuating the armature is not shown.

Figure 1:
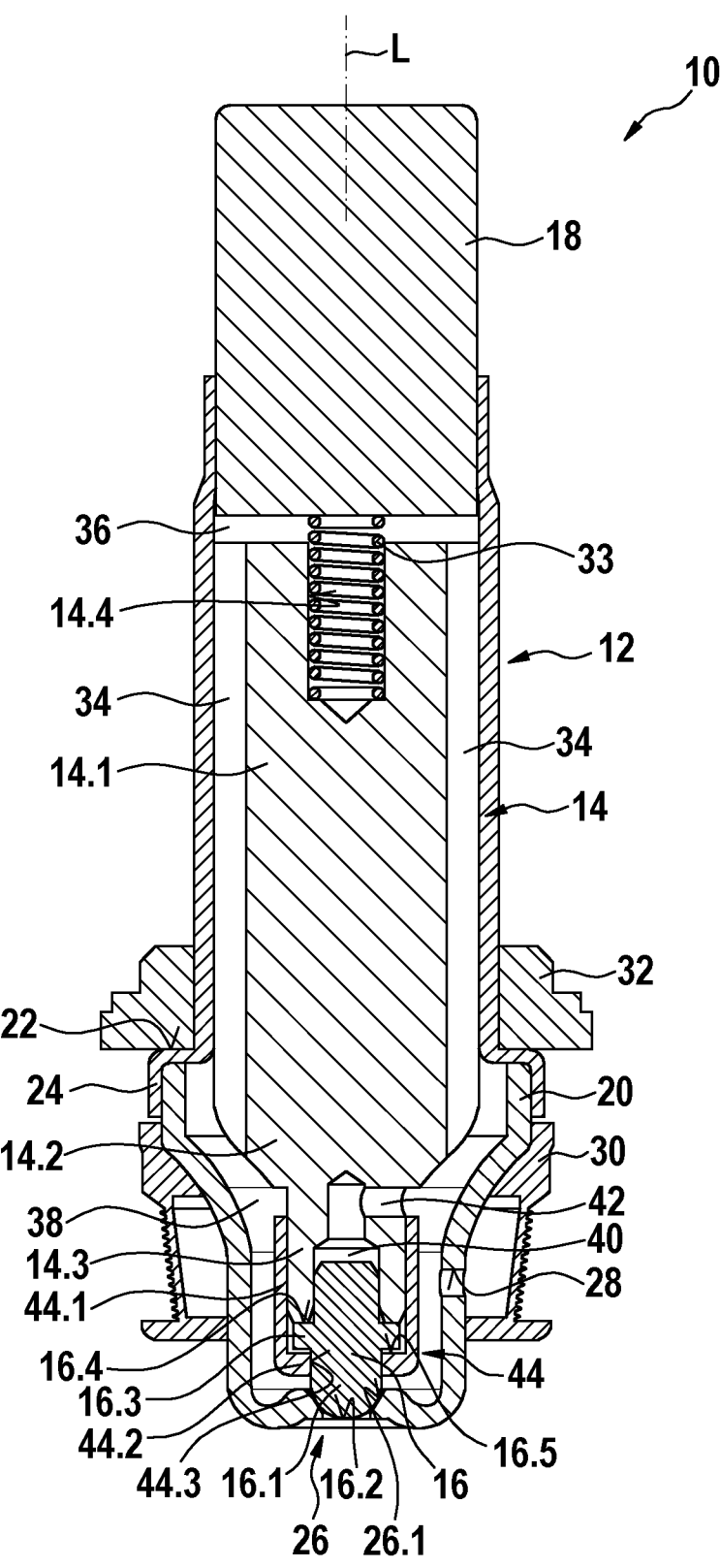
FIG. 1 shows a pressure medium control valve according to an example embodiment of the present invention in the closed position.

The pressure medium-carrying part of a pressure medium control valve 10 shown in FIG. 1 comprises, among other things, a sleeve-shaped valve housing 12, an armature 14 accommodated inside the interior of this valve housing 12 and guided displaceably in the direction of a longitudinal valve axis L, a closing element 16 tethered to the armature 14 according to the present invention, a pole core 18 closing the valve housing 12 at one end, and a valve casing 20 arranged on the valve housing 12 opposite the pole core 18.

The valve housing 12 is a slim, hollow cylindrical component which is expanded once in a step-like manner around its periphery at its end facing the valve casing 20. The expansion forms a shoulder 22 projecting radially from the valve housing 12, which merges into an annular collar 24 at its outer end. This annular collar 24 extends in the direction of the longitudinal valve axis L and encloses one of the open ends of the valve housing 12. The valve casing 20 is inserted into this open end until it stops against the inside of the shoulder 22.

The annular collar 24 surrounds a facing section of the valve casing 20 and forms a force-fit connection therewith. Accordingly, the valve casing 20 and the valve housing 12 are connected to form a single unit.

The valve casing 20 constricts in a bottle-neck shape toward its end remote from the valve housing 12, and terminates in an end face where a first valve opening 26 is formed. This first valve opening 26 is arranged centrically to the longitudinal valve axis L and forms a control cross-section 26.1 of the pressure medium control valve 10 directed towards the interior of the valve housing 12. The control cross-section 26.1 is designed by way of example as a conical valve seat and is closed by the abutting closing element 16 in the illustration according to FIG. 1. A flat or ball seat would be equally possible.

A second valve opening 28 is formed as a cylinder bore at the neck of the valve casing 20. The second valve opening 28 is located in an area where an annular filter 30 is attached to the outer periphery of the valve casing 20, so that pressure medium flowing to or from the second valve opening 28 can be filtered of contaminants.

A caulking ring 32 is threaded onto the cylindrical section of the valve housing 12. This caulking ring 32 rests on the outside of the shoulder 22 on the valve housing 12 and serves to hold down the pressure medium control valve 10 in a provided valve receptacle of a housing block (each not shown). A peripheral contour of the caulking ring 32 is formed for caulking it to the housing block. A caulking tool is used to plastically deform material of the housing block in such a way that this caulked material covers the caulking ring 32 at least in sections.

The valve housing 20 protrudes with its housing section located above the caulking ring 32 according to FIG. 1 over an attachment surface of the housing block. At this protruding end, the pole core 18 is inserted into and attached to the valve housing 12 in sections. An end face of the pole core 18 projecting into the interior of the valve housing 12 serves as a first support for a valve spring 33. This valve spring 33 extends into a blind hole-shaped valve spring seat 14.4 of the armature 14 and is supported there for the second time. The armature 14 is directly opposite the pole core 18.

The armature 14 is divided into a plurality of successive longitudinal sections in the direction of the longitudinal valve axis L. The armature 14 is axially guided on the inner wall of the valve housing 12 via a guide section 14.1. A plurality of continuous and outwardly open longitudinal channels 34 are formed peripherally on this guide section 14.1, through which a pressure medium passes into an armature chamber 36 formed between the pole core 18 and the armature 14.

The guide section 14.1 extends into the interior of the valve casing 20, where it merges into a transition section 14.2 of the armature 14 and ends at a cylinder section 14.3. This cylinder section 14.3 has an outer dimension that is significantly smaller than the outer dimension of the guide section 14.1. Between an inner wall of the valve casing 20 and a peripheral surface of the armature 14 in the area of the transition section 14.2 and the cylinder section 14.3, there is a valve chamber 38 filled with pressure medium, into which the above-mentioned longitudinal channels 34 open at the guide section 14.1.

A closing element guide 40 is formed on the armature 14 in the center of the cylinder section 14.3. This closing element guide 40 comprises a blind-hole bore which is stepped in its internal diameter from the outside to the inside and which is connected to the valve chamber 38 via a pressure medium channel 42 extending transversely thereto, by way of example. Because the second valve opening 28 formed on the neck section of the valve casing 20 also opens into the valve chamber 38, there is a pressure medium-conducting connection between the closing element guide 40 and this second valve opening 28.

In the closing element guide 40, the closing element 16 of the pressure medium control valve 10 is guided axially, i.e., in the direction of the longitudinal valve axis L, so that it can be displaced. The closing element 16 is a plunger having a cylindrical plunger shaft 16.1 and a spherically curved plunger head 16.2 formed at one of the ends of this plunger shaft 16.1. According to FIG. 1, this plunger head 16.2 closes the control cross-section 26.1 of the pressure medium control valve 10, while the closing element 16 is displaceably accommodated inside the closing element guide 40 with an end section of the plunger shaft 16.1 facing the armature.

A radially projecting axial stop 16.3 is formed approximately in the center of the cylindrical plunger shaft 16.1. This axial stop 16.3 is designed as a circumferential annular bead with two stop surfaces 16.4, 16.5 opposite each other in plane-parallel arrangement. In FIG. 1, a first stop surface 16.4 rests against the end face of the cylinder section 16.3 of the armature 16. The second stop surface 16.5 of the closing element 16 opposite thereto is associated with the inside of an armature capsule 44, by means of which the closing element 16 is tethered to the armature 14 in a relatively movable manner.

This armature capsule 44 forms a cup-shaped tether device with a circumferential cup rim 44.1 and a cup bottom 44.2 formed integrally with this cup rim 44.1. The cup bottom 44.2 is provided with an aperture 44.3 through which the closing element 16 protrudes from the armature capsule 44 with its end section comprising the plunger head 16.2 and cooperates directly with the control cross-section 26.1 of the pressure medium valve 10. The dimensions of the aperture 44.3 are larger than the outer dimensions of the plunger shaft 16.1.

The armature capsule 44 is force-fit fixed via its cup rim 44.1 to the periphery of the cylinder section 14.3 of the armature 14 in such a way that the closing element 16 accommodated inside the armature capsule 44 can move relative to the armature 14 in the direction of the longitudinal valve axis L. For this purpose, the armature capsule 44 is pushed onto the cylinder section 14.3 only to such an extent that a distance is established between the end face of the armature 14 and the inside of the cup bottom 44.1 which is greater than the dimensions of the axial stop 16.3 of the closing element 16 located at this distance.

FIG. 1 shows the explained pressure medium control valve 10 in the closed position, i.e., a pressure medium connection between the first valve opening 26 and the second valve opening 28 is interrupted and consequently pressure medium does not flow through the pressure medium valve 10. For this purpose, the armature 14, due to the force of the valve spring 33, engages with its end face on the associated first stop surface 16.4 on the axial stop 16.3 of the closing element 16 and presses the latter against the control cross-section 26.1. The closing element 16 thereby moves within the armature capsule 44 towards the armature 14, so that the inside of the cup bottom 44.2 and the facing second stop surface 16.5 of the closing element 16 no longer abut each other, but are now spaced apart.

Figure 2:
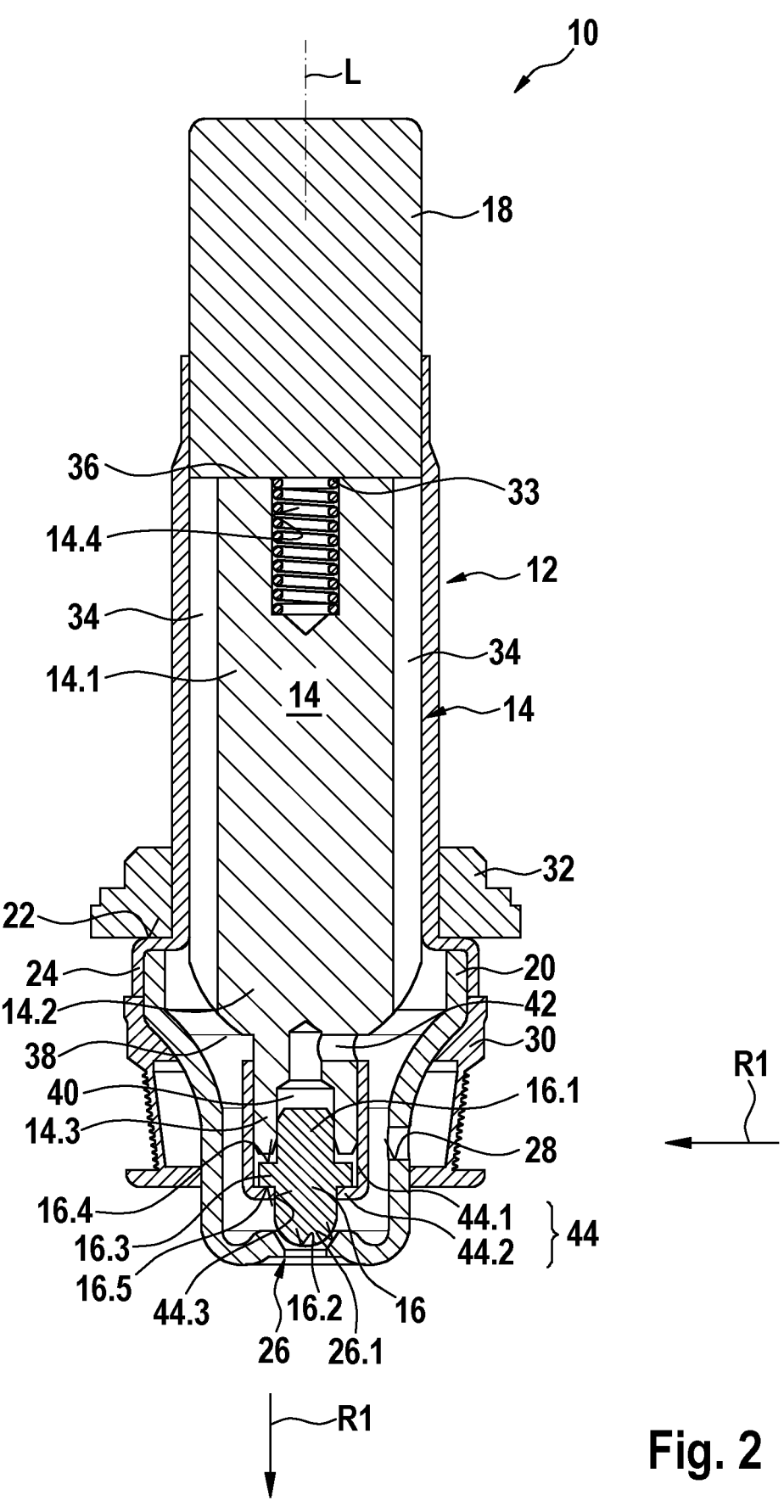
FIG. 2 shows the pressure medium control valve according to FIG. 1 in a first open position, in which a pressure medium flows through the pressure medium control valve in a first flow direction.

FIG. 2 shows the pressure medium control valve 10 according to FIG. 1 in the open position. In this open position, the armature 14 is flush against the face of the pole core 18 and the volume of the armature chamber 36 between the pole core 18 and the armature 14 is reduced to almost zero. With the stroke movement of the armature 14 in the direction of the pole core 18, the spring tension with which the armature 14 is loaded by the valve spring 33 has increased. The armature capsule 44 has followed the stroke movement due to its axially fixed arrangement on the armature 14. As a result, the cup bottom 44.2 of the armature capsule 44 is engaged with the facing second stop surface 16.5 of the closing element 16. With a progression of the stroke movement of the armature 14, the armature capsule 44 has lifted the closing element 16 from the first valve opening 26 of the pressure medium control valve 10, thereby opening the control cross-section 26.1. With the opening of the control cross-section 26.1, a pressure medium connection was created between the first valve opening 26 and the second valve opening 28.

According to FIG. 2, the second stop surface 16.5 of the closing element 16 is in contact with the inside of the cup bottom 44.2, while the first stop surface 16.4 is lifted from the front side of the armature 14. The closing element 16 assumes this position when a higher pressure level prevails at the second valve opening 28 and consequently inside the closing element guide 40 of the armature 14 than in the area of the first valve opening 26. Consequently, the medium flow through the pressure medium control valve 10 shown in FIG. 2 is from the second valve opening 28 toward the first valve opening 26, as illustrated by the directional arrows R1. The plunger head 16.2 of the closing element 16 is located relatively close to the control cross-section 26.1 and consequently exerts a corresponding throttling effect on the pressure medium flow. This throttling effect limits the flow rate of pressure medium in the given flow direction.

Figure 3:
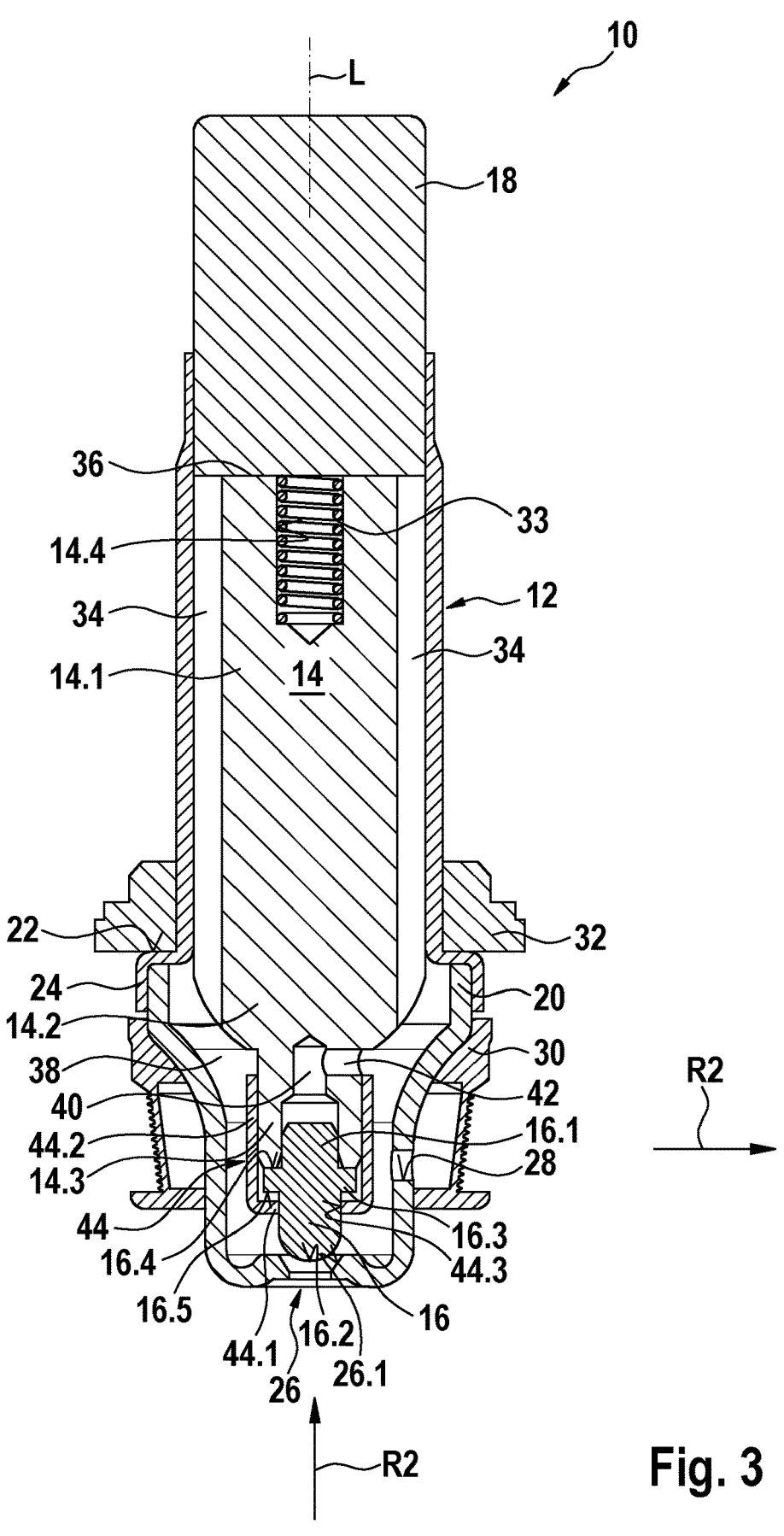
FIG. 3 shows the pressure medium control valve in a second open position, in which the pressure medium flows in the opposite direction to the first flow direction.

FIG. 3 shows the pressure medium control valve 10 again in the open position, but in this case the closing element 16 rests with its axial stop 16.3 against the armature 14 or is lifted off the inside of the cup bottom 44.2. The closing element 16 assumes this position when the pressure level at the first valve opening 26 is higher than at the second valve opening 28 or in the closing element guide 40. Accordingly, in FIG. 3, a flow through the pressure medium valve 10 occurs from the first valve opening 26 in the direction of the second valve opening 28 (direction arrows R2) and thus in the opposite direction to the flow direction according to FIG. 2.

In the valve position according to FIG. 3, the plunger head 16.2 of the closing element 16 is at a maximum distance from the control cross-section 26.1 and thus has only a slight throttling effect on the pressure medium flow through the pressure medium control valve 10. Consequently, more pressure medium flows through the pressure medium control valve 10 per unit of time in the valve position according to FIG. 3 than in the valve position according to FIG. 2. In this manner, the pressure medium control valve 10 is designed for different throttling of a pressure medium flow between the first valve opening 26 and the second valve opening 28 according to the flow direction R1, R2 of the pressure medium flow through the pressure medium control valve 10.

For a change from the closed position according to FIG. 1 to an open position according to FIG. 2 or FIG. 3, the pressure medium control valve 10 is equipped with a valve coil which is not shown. This valve coil surrounds the cylindrical part of the valve housing 12 and generates a magnetic field when it is electrically controlled. Pole core 18, valve housing 12, and armature 14 are made of magnetically conductive material, so that the two poles of this magnetic field are consequently formed on the opposing end faces of pole core 18 and armature 14. When the solenoid coil is energized, attractive forces are created between the two components, which trigger the described stroke movement of the armature 14 in the direction of the pole core 18.

When the electrical control of the valve coil is reduced, these attractive forces decrease so that the spring tension of the valve spring 33 is sufficient to return the armature 14 and the closing element 16 tethered to it to the basic position shown in FIG. 1.

Of course, changes or additions to the described exemplary embodiment are possible without the resulting products leaving the scope of protection of the present application.

It should be noted in this connection that the explained pressure medium control valve 10 has been disclosed merely by way of example as a normally closed valve. A normally open variant would be implementable accordingly.

Furthermore, it is not necessarily necessary for the present invention to provide the pressure medium control valve 10 with a valve coil as an actuator.

The invention claimed is:

1. An electromechanically actuatable bi-directional pressure medium control valve, comprising:

a valve housing in which an armature that can be driven to perform a stroke movement in a direction of a longitudinal valve axis is movably accommodated;

a pole core configured to limit the armature movement in one direction of movement;

a valve casing with a control cross-section formed thereon; and a closing element which controls a pressure medium flow through the control cross-section and can be actuated by the armature, wherein the closing element is coupled to the armature by a tether device, wherein the tether device includes an armature capsule which is fixed to the armature and in which the closing element is displaceably accommodated, wherein the closing element and the control cross-section are configured for different throttling of a pressure medium flow between a first valve opening and a second valve opening according to a flow direction of a pressure medium flow through the electromechanically actuatable bi-directional pressure medium control valve, such that the pressure medium flow is throttled when the pressure medium flow is in a first flow direction from the first valve opening to the second valve opening and the pressure medium flow is throttled differently when the pressure medium flow is in a second flow direction from the second valve opening to the first valve opening.

2. The electromechanically actuatable bi-directional pressure medium control valve according to claim 1, wherein the tether device allows for movement of the closing element relative to the armature in or against a stroke direction of the armature.

3. The electromechanically actuatable bi-directional pressure medium control valve according to claim 1, wherein the armature capsule is cup-shaped, is firmly anchored to an outer periphery of the armature by a cup rim, and has a cup bottom with an aperture.

4. The electromechanically actuatable bi-directional pressure medium control valve according to claim 3, wherein the closing element is a plunger having a plunger shaft and a plunger head, wherein the plunger protrudes through the aperture with an end section having the plunger head and cooperates directly with the control cross-section.

5. The electromechanically actuatable bi-directional pressure medium control valve according to claim 4, wherein a radially projecting axial stop is formed on the plunger shaft.

6. The electromechanically actuatable bi-directional pressure medium control valve according to claim 5, wherein the radially projecting axial stop is a circumferential annular bead with stop surfaces lying opposite one another, a first stop surface of the stop surfaces facing an end face of the armature, and a second stop surface of the stop surfaces facing an area of the armature capsule which encloses the aperture.

7. The electromechanically actuatable bi-directional pressure medium control valve according to claim 4, wherein the closing element is displaceably accommodated inside a closing element guide on the armature with an end section of the plunger shaft facing the armature.

8. The electromechanically actuatable bi-directional pressure medium control valve according to claim 7, wherein the closing element guide is in contact with one of the first and second valve openings of the pressure medium control valve via a pressure medium channel formed on the armature so as to conduct pressure medium.

9. The electromechanically actuatable bi-directional pressure medium control valve according to claim 1, wherein the armature is acted upon by a valve spring, and the electromechanically actuatable bi-directional pressure medium control valve can be switched by electrical control from a basic position, in which a pressure medium connection between the first valve opening and the second valve opening is interrupted, into an open position.

10. The electromechanically actuatable bi-directional pressure medium control valve according to claim 1, wherein the electromechanically actuatable bi-directional pressure medium control valve controls a pressure medium connection provided between a master brake cylinder and a pedal travel simulator in an electronically pressure controllable vehicle brake system.

11. The electromechanically actuatable bi-directional pressure medium control valve according to claim 1, wherein the pressure medium flow is throttled according to a first plurality of throttling settings in the first flow direction, wherein the pressure medium flow is throttled according a second plurality of throttling settings in the second flow direction, and wherein the second plurality of throttling settings is different from the first plurality of throttling settings.

* * * * *